(12) United States Patent  
Wu

(10) Patent No.: US 11,179,795 B2  
(45) Date of Patent: Nov. 23, 2021

(54) WELDING CUP SYSTEMS AND METHODS

(71) Applicant: Arthur Wu, Long Beach, CA (US)

(72) Inventor: Arthur Wu, Long Beach, CA (US)

( * ) Notice: Subject to any disclaimer, the term of this patent is extended or adjusted under 35 U.S.C. 154(b) by 367 days.

(21) Appl. No.: 16/209,692

(22) Filed: Dec. 4, 2018

(65) Prior Publication Data

US 2020/0114455 A1 Apr. 16, 2020

Related U.S. Application Data

(60) Provisional application No. 62/744,130, filed on Oct. 11, 2018.

(51) Int. Cl.
| | | |
|---|---|---|
| *B23K 9/29* | (2006.01) | |
| *B23K 9/23* | (2006.01) | |
| *B23K 9/32* | (2006.01) | |
| *B23K 9/16* | (2006.01) | |
| *B23K 31/02* | (2006.01) | |
| *B23K 9/28* | (2006.01) | |

(52) U.S. Cl.
CPC ............... *B23K 9/291* (2013.01); *B23K 9/16* (2013.01); *B23K 9/232* (2013.01); *B23K 9/325* (2013.01); *B23K 31/02* (2013.01); *B23K 9/287* (2013.01); *B23K 9/321* (2013.01)

(58) Field of Classification Search
CPC ........ B23K 9/293; B23K 9/295; B23K 9/296; B23K 9/16; B23K 9/232; B23K 9/325; B23K 9/287; B23K 9/321; B23K 31/02; B23K 9/291
See application file for complete search history.

(56) References Cited

U.S. PATENT DOCUMENTS

| | | | |
|---|---|---|---|
| 3,875,364 A | 4/1975 | Boyett | |
| 4,298,783 A | 11/1981 | Schneider | |
| 4,599,505 A | 7/1986 | Lukens | |
| 4,839,489 A | 6/1989 | Dyer | |
| 5,013,885 A | 5/1991 | Carkhuff | |
| 5,034,593 A | 7/1991 | Rice | |
| 5,081,334 A | 1/1992 | Copher | |
| 5,393,949 A * | 2/1995 | Stricklen | B23K 9/167 219/74 |
| 5,614,117 A | 3/1997 | Krobath | |

(Continued)

FOREIGN PATENT DOCUMENTS

| | | |
|---|---|---|
| CA | 1067583 A | 12/1979 |
| CN | 204944955 U | 1/2016 |

(Continued)

*Primary Examiner* — Brian W Jennison  
(74) *Attorney, Agent, or Firm* — Wesley E. Schwie, Esq.; Gallium Law

(57) ABSTRACT

The disclosure includes a welding cup system comprising a tube having an open top, an open bottom, a sidewall extending between the open top and the open bottom, and an open channel. The open channel may extend through an interior portion of the tube from the open top to the open bottom. The open top may be arranged and configured to slideably couple to at least a portion of a torch assembly. The open channel may be arranged and configured to allow gas to flow from the open top to the open bottom, and allow a welding electrode to extend through the open channel from open top towards the open bottom. The welding cup system may have a side profile that may define an asymmetrical shape.

20 Claims, 12 Drawing Sheets

(56) References Cited

U.S. PATENT DOCUMENTS

| | | | |
|---|---|---|---|
| 5,721,417 | A | 2/1998 | Craig |
| 6,040,545 | A | 3/2000 | Taki |
| 7,220,935 | B2 | 5/2007 | Ireland |
| 7,456,370 | B2 | 11/2008 | Beeson |
| 9,338,873 | B1 | 5/2016 | Furick |
| 9,694,444 | B2 | 7/2017 | Mottin |
| 2008/0142489 | A1 | 6/2008 | Willis |
| 2009/0230107 | A1 | 9/2009 | Ertmer |
| 2013/0193117 | A1* | 8/2013 | Wada ............... B23K 9/325 219/75 |
| 2014/0263192 | A1 | 9/2014 | Miller |

FOREIGN PATENT DOCUMENTS

| | | | |
|---|---|---|---|
| WO | 1996005935 | A3 | 7/1996 |
| WO | 2017212240 | A1 | 12/2017 |

* cited by examiner

WELDING CUP SYSTEMS AND METHODS

CROSS-REFERENCE TO RELATED APPLICATIONS

This application claims the benefit of U.S. Provisional Patent Application No. 62/744,130; filed Oct. 11, 2018; and entitled WELDING CUP DEVICES AND METHODS. The entire contents of U.S. Provisional Patent Application No. 62/744,130 are incorporated herein by reference.

BACKGROUND

Field

Various embodiments disclosed herein generally relate to the field of welding. More specifically, the present disclosure relates to devices and methods for welding cups.

Description of Related Art

Welding is a process that joins materials, usually metals, by using high heat to melt the parts together and allowing them to cool causing fusion. One such welding process is called TIG (tungsten inert gas) welding, also known as GTAW (gas tungsten arc welding), which uses a non-consumable tungsten electrode to produce the weld. During TIG welding, a handheld torch is used to deliver an electric current to the target base metal. The energy from the electric current heats the metal to melting temperature and forms what is commonly called a weld "puddle". At this high temperature, metal quickly oxidizes and rusts, causing the metal to degrade and often form an improper bond. To prevent this, a shielding gas, such as argon gas, is delivered to the weld puddle. The shielding gas creates an invisible gas shield around the weld puddle and prevents oxygen from entering the weld. Because argon gas is heavier than air, it can cover the puddle for limited time as it slowly falls and dissipates. To properly direct the argon gas to the welded metals, a welding "cup" is attached to the end of the torch. Welding cups can vary in size depending on the needs of the weld; as more argon is needed, the diameter of the cup is increased to provide a larger surface area of gas coverage.

Welding is performed in one direction, forming what is called a weld "line" or "bead." Despite this, TIG cups known in prior art and currently in the marketplace are cylindrical in shape. If a welder wants to cover a larger area of the weld bead with argon gas while welding, a larger cylindrical cup is used to disperse more argon. While larger cups may cover more of the weld bead, the welder's visibility is inhibited as the circular shape increases in size. This may result in inaccurate and uneven welds, thus wasting material as the welder must start over with new material. Moreover, larger cups require a larger flow of argon gas, which can be expensive and wasteful because not all of the argon gas is directed to the weld bead and instead directed to unwelded areas that do not need to be cooled and protected from environmental contaminants.

Another method to obtain shielding gas coverage over the weld bead comes in the form of a trailing shield, which is an additional attachment that may couple to the torch and includes a separate gas line connection for the flow of shielding gas. Unfortunately, trailing shields are expensive and require extra setup time. Thus, there is a need for a welding cup that may cover larger portions of the weld bead without inhibiting visibility, wasting shielding gas, and requiring additional equipment.

SUMMARY

The disclosure describes methods for using a welding cup system. The welding cup system may comprise a tube. The tube may include an open top, an open bottom, a sidewall extending between the open top and the open bottom, and an open channel. The open channel may extend through an interior portion of the tube from the open top to the open bottom. The open top may be arranged and configured to slideably couple to at least a portion of a torch assembly.

In several embodiments, the open channel may be arranged and configured to allow gas to flow from the open top to the open bottom, and allow a welding electrode to extend through the open channel from open top towards the open bottom. The tube may have a side profile that may define an asymmetrical profile. The open top may define a first area, and the open bottom may define a second area that is greater than the first area.

The welding cup system may further include a gas diffuser that may be coupled to the tube and located within the open channel between the open top and the open bottom. As gas flows from the open top to the gas diffuser, the gas diffuser may be arranged and configured to evenly spread the gas as it reaches the open bottom. The gas diffuser may include an aperture that may be arranged and configured to allow the welding electrode to pass through the gas diffuser. The aperture may be located off-center on the gas diffuser.

In some embodiments, a bottom side of the open bottom defines a leading side and a trailing side located opposite the leading side. The leading side may define a first radius and the trailing side may define a second radius that may be smaller than the first radius. A bottom side of the open bottom may define a teardrop shape. Further, the sidewall may include a leading surface and a trailing surface located opposite the leading surface. The leading surface may extend along a first direction and the trailing surface may extend along a second direction that may be angled with respect to the first direction.

In several embodiments, the open bottom may be arranged and configured to allow gas flow to reach a post-welded surface to thereby cool the post-welded surface and reduce oxidation in the post-welded surface. An area from the trailing side to the welding electrode may be greater than an area from the leading side to the welding electrode.

In some embodiments, when gas flows through the gas diffuser, a first amount of gas may pass through an area between the trailing side and the welding electrode. Additionally, a second amount of gas may pass through an area between the leading side and the welding electrode.

The disclosure also includes methods of directing argon gas to a metal surface during a welding operation. Methods may include welding the metal surface with a welding electrode that extends through a welding cup. The welding cup may have an open top, an open bottom, a sidewall extending between the open top and the open bottom, and an open channel that extends through an interior portion of the welding cup from the open top to the open bottom. The open top may define a first area and the open bottom may define a second area that is greater than the first area.

Methods may further include cooling a welded surface located under the open bottom. The welded surface may be cooled by directing gas from the open top through the open bottom to the welded surface. As well, methods may include cooling a post-welded surface located under the open bottom. The post-welded surface may be cooled by directing gas from the open top through the open bottom to the post-welded surface.

In several embodiments, the welded surface defines a welded area and the post-welded surface defines a post-welded area that may be greater than the welded area. In some embodiments, the method includes slideably coupling the open top to at least a portion of a torch assembly. Methods may also include diffusing, via a gas diffuser, the gas across the welded surface and the post-welded surface. As such, the gas diffuser may be coupled to the welding cup and located within the open channel between the open top and the open bottom. In several embodiments, the gas comprises argon gas.

In some embodiments, a welding cup system comprises a tube. The tube may have an open top, an open bottom, a sidewall extending between the open top and the open bottom, and an open channel. The open channel may extend through an interior portion of the tube from the open top to the open bottom. The open top may be arranged and configured to slideably couple to at least a portion of a torch assembly.

In several embodiments, the open channel is arranged and configured to allow gas to flow from the open top to the open bottom. The open channel may also allow a welding electrode to extend through the open channel from open top towards the open bottom.

The open top may define a first shape and the open bottom may define a second shape. In some embodiments, the first shape is different from the second shape. The first shape may have an area that may be smaller than an area of the second shape. Even still, the first shape and the second shape may define a same shape. The first shape may have an area that may be smaller than an area of the second shape.

The welding cup system may further include a gas diffuser that may be coupled to the tube and located within the open channel between the open top and the open bottom. As gas flows from the open top to the gas diffuser, the gas diffuser may thereby be arranged and configured to evenly spread the gas as it reaches the open bottom.

According to some embodiments, a bottom side of the open bottom may define a teardrop shape. The teardrop shape may have a leading side and a trailing side located opposite the leading side. As such, an area from the trailing side to the welding electrode may be greater than an area from the leading side to the welding electrode.

In several embodiments, when gas flows through the gas diffuser, a first amount of gas passes through the area between the trailing side and the welding electrode. Additionally, a second amount of gas may pass through the area between the leading side and the welding electrode. Accordingly, the first amount of gas may be greater than the second amount of gas.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
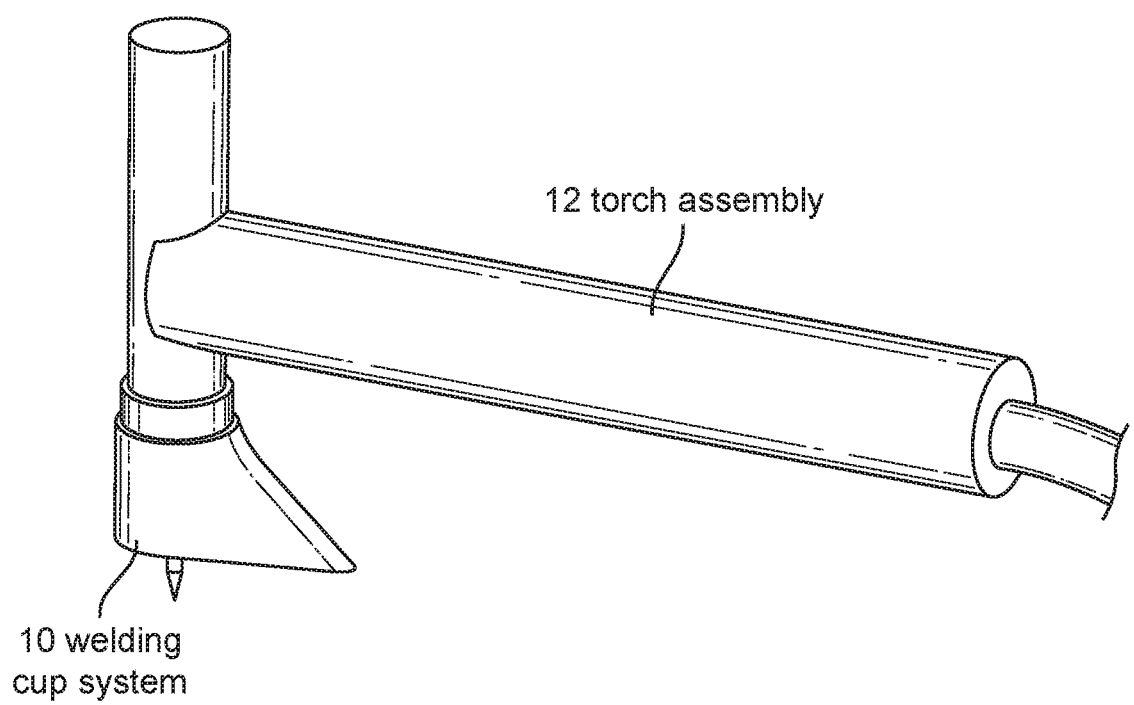
FIG. 1 illustrates a perspective view of a welding cup system and a torch assembly, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

REFERENCE NUMERALS

10—Welding cup system
12—Torch assembly
14—Tube
16—Open top
18—Open bottom
20—Sidewall
22—Open channel
24—Interior portion
26—Welding electrode
30—First area
32—Second area
34—Gas diffuser
36—Aperture 40—Bottom side
42—Leading side
44—Trailing side
46—First radius
48—Second radius
50—Leading surface
52—Trailing surface
54—First direction
56—Second direction
60—Post-welded surface
62—Trailing area
64—Leading area
66—First amount of gas
68—Second amount of gas
70—Welded surface
72—Metal filler
74—First shape
76—Second shape

Introduction

TIG welding is practiced by delivering an electric current to a metal filler that melts and thereby cools causing fusion of two or more metal parts. At the temperature at which the metal filler and metal parts are welded, the metals quickly oxidize and rust, which can cause degradation and the formation of an improper weld. To prevent such issues, welding "cups" are attached to a torch assembly and used to direct a shielding gas, frequently argon gas, toward the welding surface to cool the metal and thereby prevent environmental contamination, such as oxidation.

Welding is performed in one direction to create a weld "line" or "bead". Unfortunately, current welding cups do not properly reflect the shape of the weld bead. As such, cylindrical welding cups cover a much larger surface than is necessary, directing argon gas beyond the weld bead that needs to be cooled. Even so, as a welder desires a larger area of argon gas coverage over a weld bead, a larger welding cup is required. While larger cylindrical welding cups cover more of the weld bead, larger cups also cover a larger area outside of the weld bead, needlessly wasting considerable amounts of argon gas. Additionally, such cylindrical welding cups limit the welder's visibility of the welding surface. Limited visibility can result in mistakes and wasted material.

As such, this disclosure provides welding cup systems and methods to solve the problems described above. Such systems may more precisely cool a welded surface and eliminate excess amounts of argon gas wasted by current welding cups.

System Embodiments

FIG. 1 illustrates a welding cup system 10 coupled to a torch assembly 12. The welding cup system 10 may be constructed of material that is resistant to high temperatures, such as alumina oxide, quartz, borosilicate glass, silicon nitride, lava, ceramic, anodized aluminum, any material that is thermal shock resistant, any combination thereof, and the like.

Figure 2:
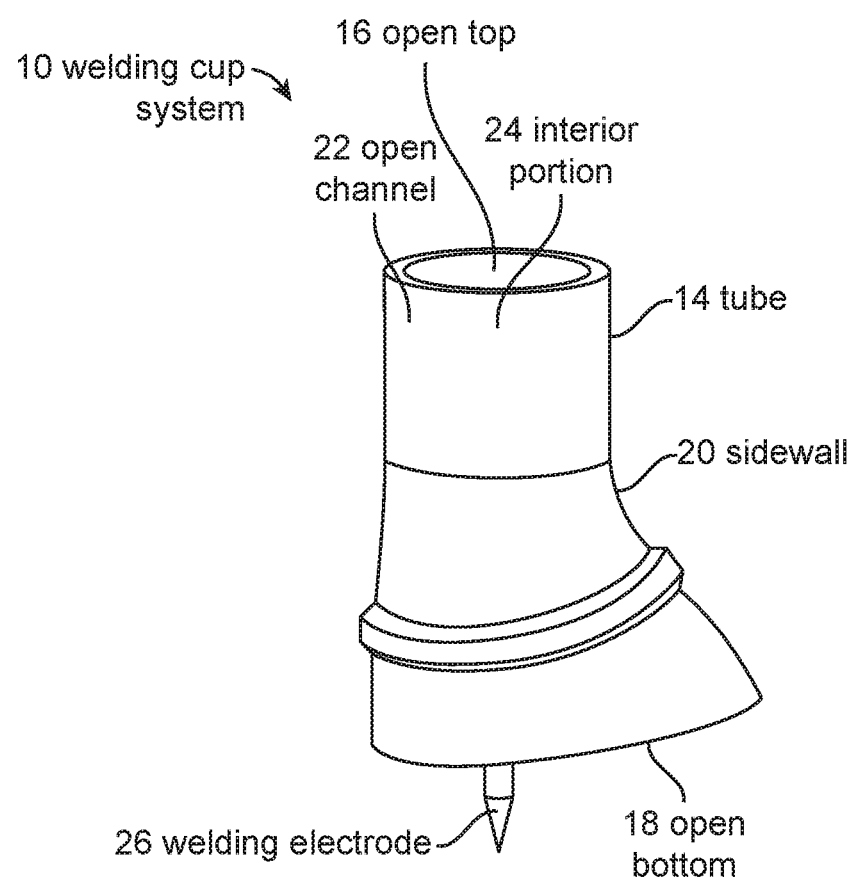
FIG. 2 illustrates a perspective view of a welding cup system, according to some embodiments.

As shown in FIG. 2, the welding cup system 10 may comprise a tube 14, which may include an open top 16, an open bottom 18, a sidewall 20 extending between the open top 16 and the open bottom 18, and an open channel 22 extending through an interior portion 24 of the tube 14 from the open top 16 to the open bottom 18. The open top 16 may be arranged and configured to slideably couple to at least a portion of the torch assembly 12. In some embodiments, the torch assembly 12 includes a collet holder and a gas lens whereby the open top 16 couples to at least one of the collet holder and the gas lens.

In some embodiments, the open channel 22 may be arranged and configured to allow gas to flow from the open top 16 to the open bottom 18. The gas that may flow from the open top 16 to the open bottom 18 may be a shielding gas, including, but not limited to argon, helium, carbon dioxide, any combination thereof, and the like. As well, the shielding gas may include any of the aforementioned gasses combined with oxygen.

Additionally, the open channel 22 may be arranged and configured to allow a welding electrode 26 to extend through the open channel 22 from the open top 16 towards the open bottom 18. The welding electrode 26 may be made of at least one of tungsten, and a combination of tungsten and other metals, such as thorium, cerium, lanthanum, zirconium, and the like. The welding electrode 26 may be arranged and configured to conduct an electric current from the torch assembly 12 to a work piece, such that an electric arc may form between the welding electrode 26 and the work piece. The electric arc may produce heat that may weld metals of the work piece.

Figure 3:
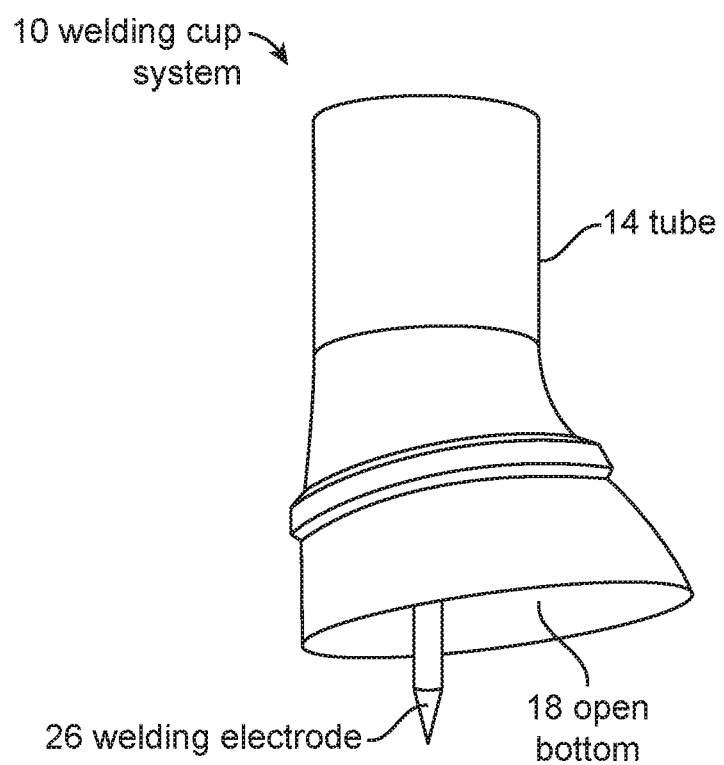
FIG. 3 illustrates a bottom perspective view of a welding cup system, according to some embodiments.

As illustrated in FIGS. 2 and 3, the open top 16 may define a first area 30, and the open bottom 18 may define a second area 32 that may be greater than the first area 30. In this manner, the tube 14 may define an asymmetric profile that allows a gradually decreasing amount of shielding gas to flow over a welded portion of the work piece so the welded portion may be cooled as the welding cup system 10 and the torch assembly 12 continue to move over and weld the work piece.

As previously mentioned, welders are often faced with a problem of wasting shielding gasses because cylindrical welding cups cover a much larger surface of the work piece than the area in which the metals of the work piece are joined. Shielding gas flowing through a cylindrical welding cup thus flows beyond the welded areas and is wasted. The design of the welding cup system 10, however, decreases gas flow to unnecessary areas, thus wasting less shielding gas.

In some embodiments, the first area 30 may be sized and configured such that the open top 16 may slideably couple at least one of the collet holder and the gas lens of the torch assembly 12. The second area 32 may be sized and configured such that the second area 32 may cover at least a portion of a weld bead, wherein the weld bead may define a melted metal that may join two or more metal sheets via welding. The second area 32 may also be sized and configured to cover at least a portion of the weld bead without blocking an area that has not yet been welded from a welder's line of sight.

In some embodiments, the open bottom 18 may define a teardrop shape. The teardrop shape may provide an advantage over cylindrical shaped welding cups currently in use, as the teardrop shape may cover a large portion of the weld bead to cool the weld bead without blocking a proportionally large surface of the work piece. A welder's visibility to the work piece is crucial to ensure a straight and even welds. While cylindrical welding cups may be able to cover and cool a large area of a weld bead, due to the cylindrical nature, such cups may block a proportionally large amount of the work piece that has not yet been welded from a welder's visibility.

Figure 4:
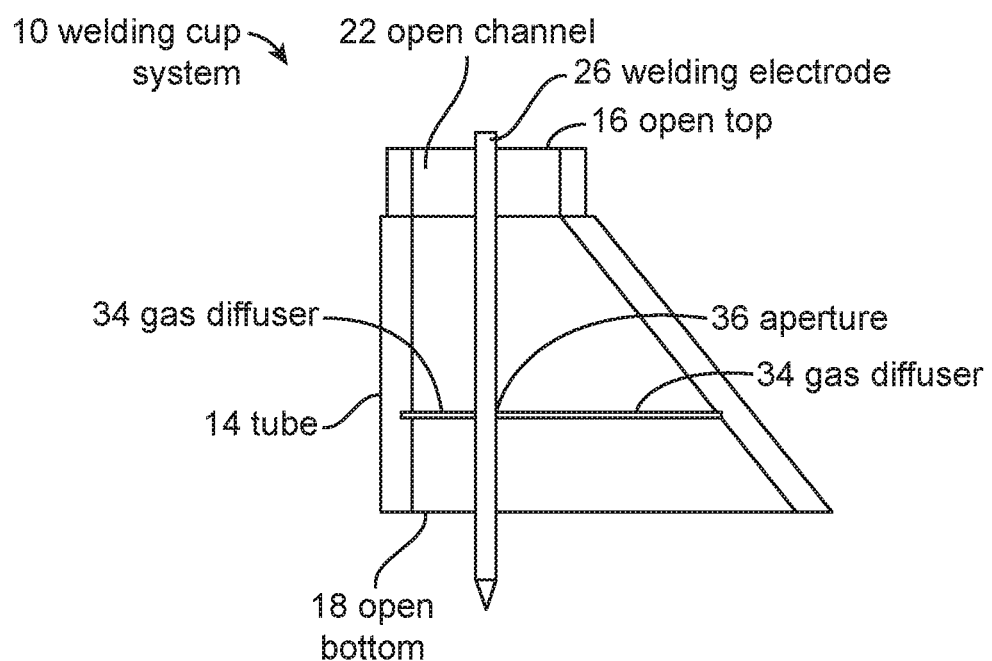
FIG. 4 illustrates a cross-sectional side view of a welding cup system, according to some embodiments.

Referring now to FIG. 4, the welding cup system 10 may include a gas diffuser 34. The gas diffuser 34 may be coupled to the tube 14 and located within the open channel 22 between the open top 16 and the open bottom 18. As gas flows from the open top 16 to the gas diffuser 34, the gas diffuser 34 may thereby be arranged and configured to evenly spread the gas as it reaches the open bottom 18.

Figure 5:
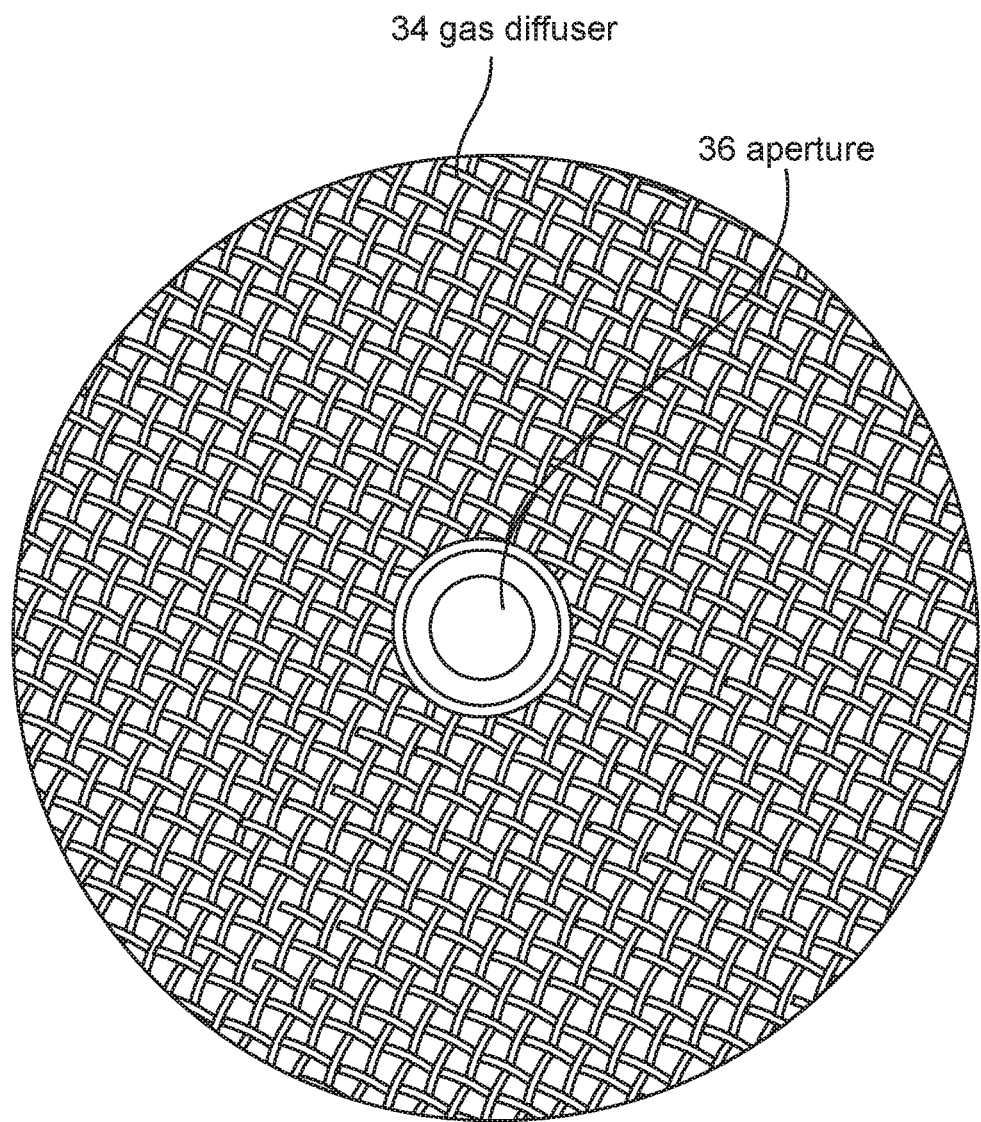
FIG. 5 illustrates a gas diffuser, according to some embodiments.

As illustrated in FIGS. 4 and 5, the gas diffuser 34 may include an aperture 36. The aperture 36 may be arranged and configured to allow the welding electrode 26 to pass through the gas diffuser 34. In some embodiments, the gas diffuser 34 may comprise at least one of an oblong shape, a circular shape, an oval shape, a rectangular shape, and the like. The gas diffuser 34 may define a same shape as a shape of the interior portion 24 of the tube 14.

In some embodiments, the aperture 36 may be located off-center on the gas diffuser 34. However, it should be appreciated that the aperture 36 may be located in the center of the gas diffuser 34. The aperture 36 may be located such that the welding electrode 26 may pass through the gas diffuser 34 in a straight manner. It should be appreciated that the aperture 36 and the gas diffuser 34 may be made of material that is resistant to high temperatures.

Figure 6:
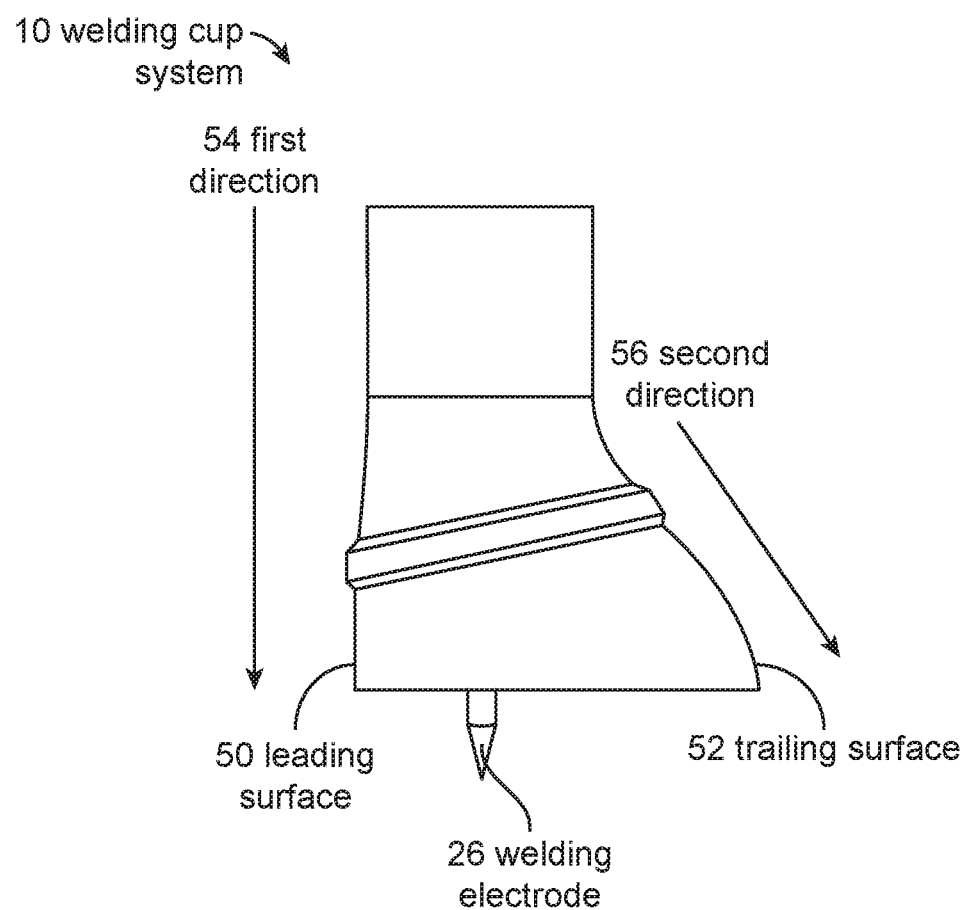
FIG. 6 illustrates a side view of a welding cup system, according to some embodiments.

As illustrated in FIG. 6, the sidewall 20 of the tube 14 may include a leading surface 50 and a trailing surface 52 located opposite the leading surface 50. The leading surface 50 may be located at a front of a work piece such that as the welding cup system 10 moves over the work piece to weld metals of the work piece, the leading surface 50 may be located above a portion of the work piece that has not yet been welded. As such, the trailing surface 52 may be located above a portion of the work piece that has already been welded. The trailing surface 52 may cover the weld bead in shielding gas that may flow through the tube 14 to thereby cool the weld bead.

In some embodiments, the leading surface 50 extends along a first direction 54 and the trailing surface 52 extends along a second direction 56 that is different than the first direction. In some embodiments, the second direction 56 is angled with respect to the first direction. The angle of the second direction 56 of the trailing surface 52 may allow for prolonged coverage of the metals being welded, as the angle may allow the welding cup system 10 an extended coverage to thereby cool the weld bead as the welding cup system 10 is moved along a work piece. Additionally, the angled trailing surface 52 may limit the amount of shielding gas being used by decreasing the volume and/or area in which the shielding gas covers along the decreasing angle of the trailing surface 52.

Figure 7:
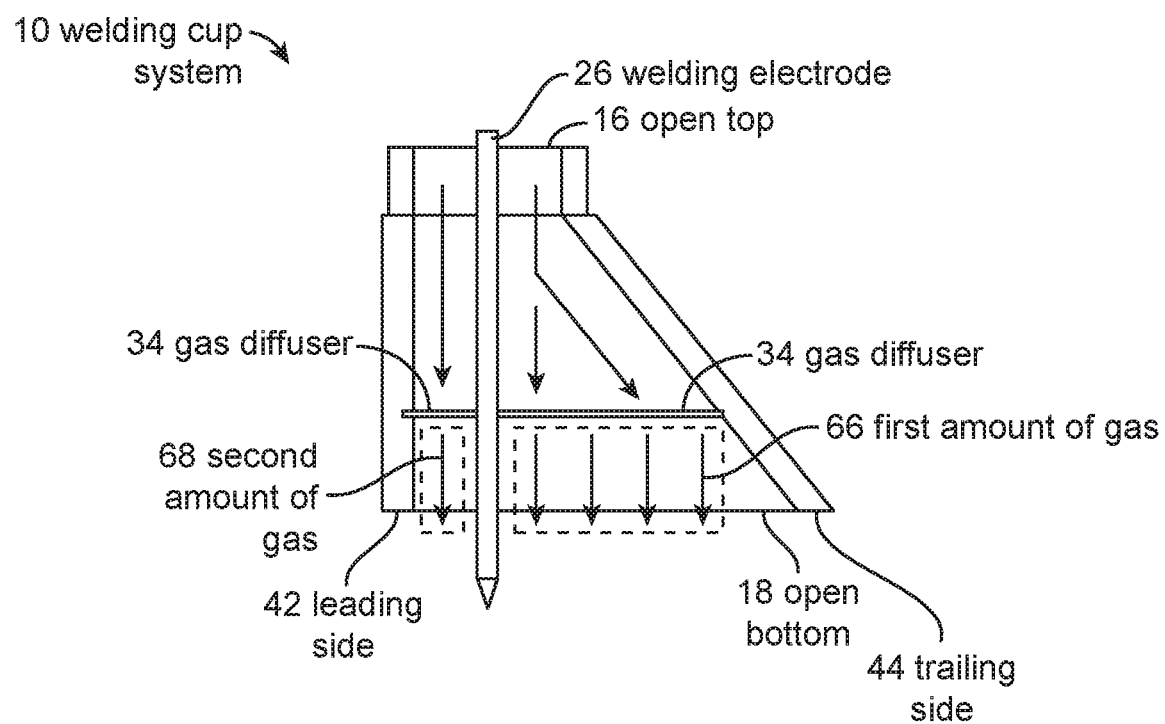
FIG. 7 illustrates a cross-sectional side view of gas passing through a welding cup system, according to some embodiments.

Referring now to FIG. 7, a bottom side 40 of the open bottom 18 may include a leading side 42 and a trailing side 44 located opposite the leading side 42. The welding cup system 10 may be employed in a manner that the leading side 42 may be located in front of the welding electrode 26 as the torch assembly 12 and the welding cup system 10 are moved across a work surface. The trailing side 44 may be located behind the welding electrode 26, and over a work surface that has already been welded.

When gas flows through the gas diffuser 34, a first amount of gas 66 may pass through an area between the trailing side 44 and the welding electrode 26. As well, a second amount of gas 68 may pass through an area between the leading side 42 and the welding electrode 26. The first amount of gas 66 may be greater than the second amount of a gas 68. As the area between the trailing side 44 and the welding electrode 26 may be greater than the area between the leading side 42 and the welding electrode 26, the amounts of gas that passes through the tube 14 on either side of the welding electrode 26 may also be different with respect to the area through which the gas is flowing. In this manner, the welding cup system 10 may be arranged and configured such that a larger amount of gas, or a greater percentage of gas, flows to the weld bead and not unnecessary parts of the metal.

Figure 8:
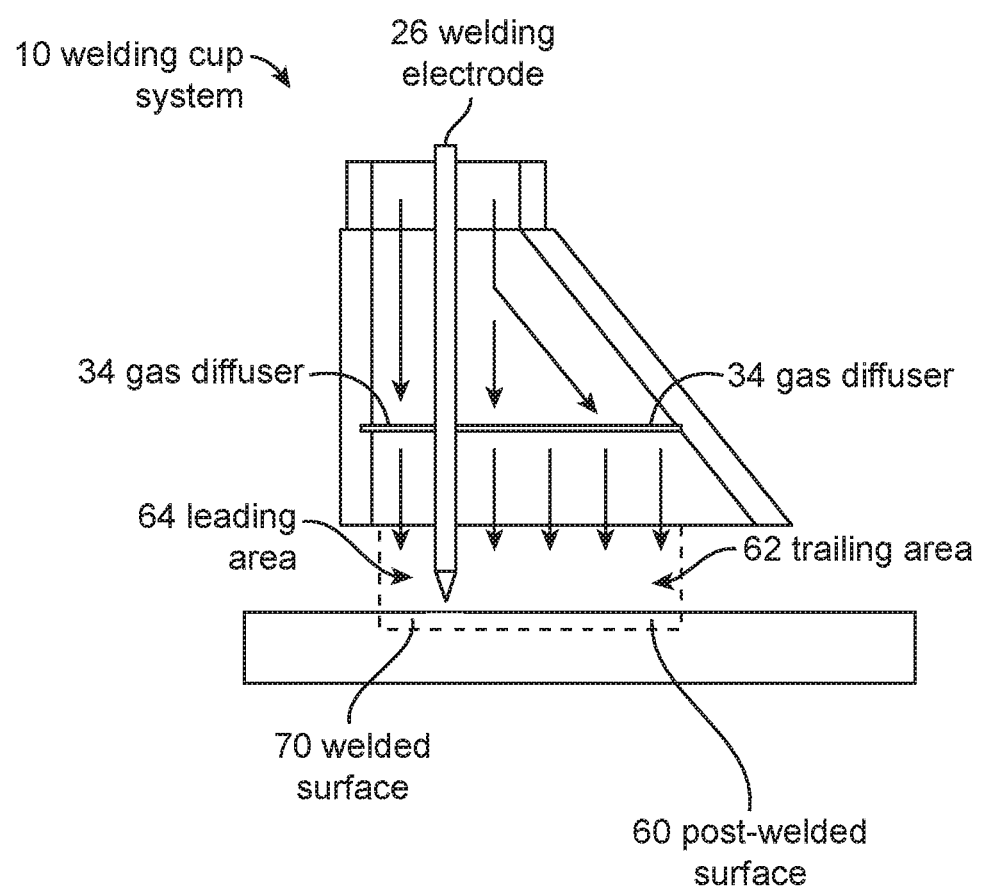
FIG. 8 illustrates a welding cup system over a welded surface and a post-welded surface, according to some embodiments.

As illustrated in FIG. 8, the shielding gas may flow through the gas diffuser 34 of the welding cup system 10. An area from the trailing side 44 to the welding electrode 26 (herein after referred to as "trailing area 62") may be greater than an area from the leading side 42 to the welding electrode 26 (herein after referred to as "leading area 64"). As gas flows through the trailing area 62, the trailing area 62 may allow the weld bead to be cooled for an extended period of time, thus reducing, and often altogether preventing, oxidation. The asymmetrical shape of the welding cup system 10 comprising the trailing area 62 may allow a welder to extend the time in which the post-welded surface 60 is covered by shielding gas without wasting unnecessary shielding gas on unnecessary surfaces.

In some embodiments, the first amount of gas 66 may flow to a post-welded surface 60 and the second amount of gas 68 may flow to a welded surface 70. The post-welded surface 60 may define a surface of the work piece over which the welding electrode 26 has passed and therefore melted the metals comprising the work piece. As previously mentioned, the post-welded surface 60 is often referred to as the "weld bead". The welded surface 70 may define a surface that is undergoing melting by means of the welding electrode 26.

In some embodiments, the first amount of gas 66 flows through the trailing area 62 to the post-welded surface 60 whereby the first amount of gas 66 cools the post-welded surface 60 and reduces oxidation in the post-welded surface 60. As such, the relatively greater trailing area 62 may allow for a relatively greater flow of gas (the first amount of gas 66) to the post-welded surface 60.

Figure 9:
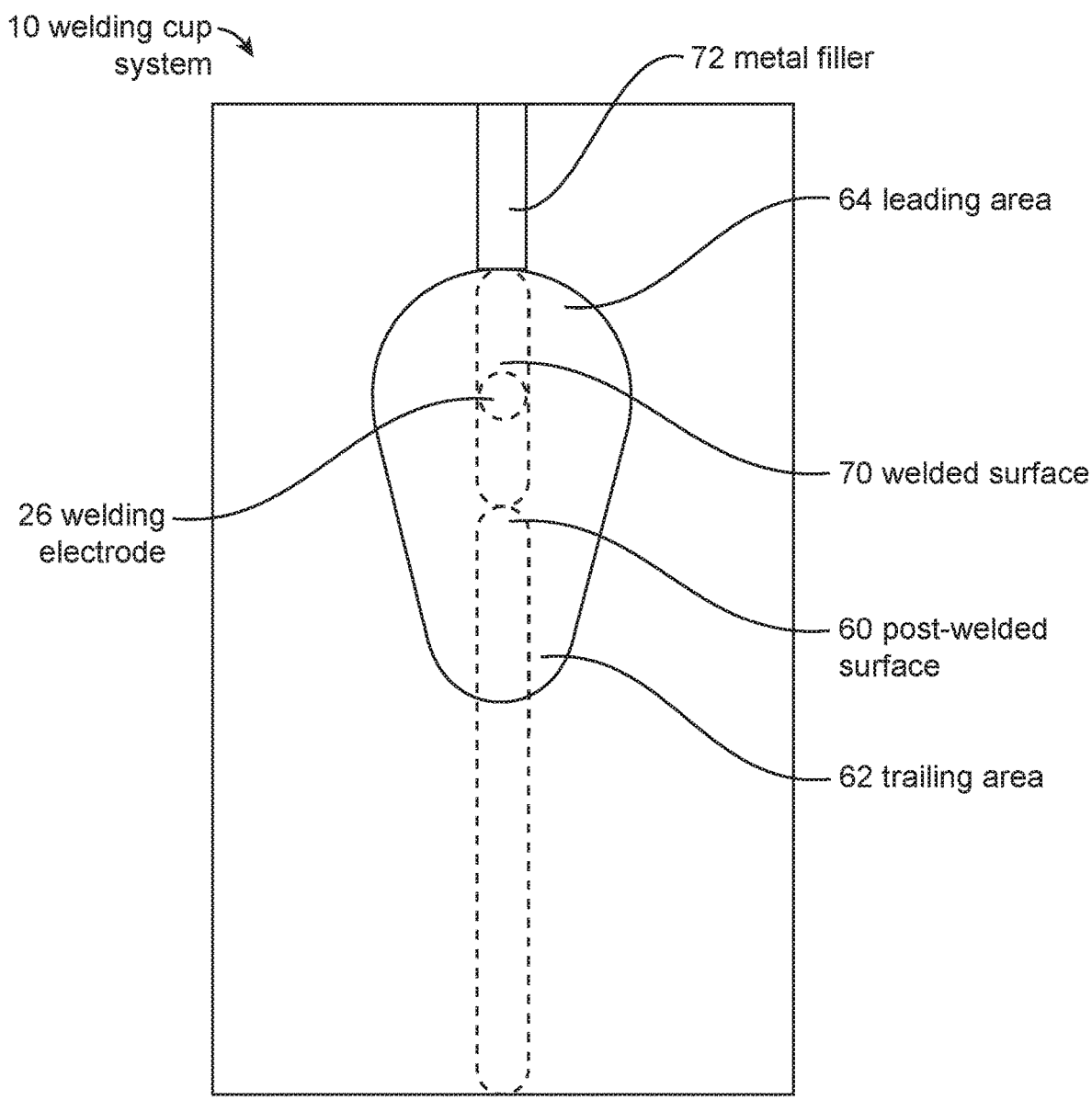
FIG. 9 illustrates a welding cup system over a welded surface and a post-welded surface, according to some embodiments.

As illustrated in FIG. 9, the leading area 64 may be located at a front of the tube 14 of the welding cup system 10. As the welding cup system 10 moves along a work surface, the leading area 64 may be located nearest to an area of the work surface that has not yet been welded. In some embodiments, the leading area 64 may be located above the welded surface 70. Shielding may flow through the leading area 64 as the welding electrode 26 conducts electric current and melts the metal filler 72 to weld the two or more metal work pieces. The trailing area 62 may be located above the post-welded surface 60 defining a weld bead.

In many embodiments, the trailing area 62 is greater than the leading area 64. In this manner, the trailing area 62 provides a greater amount of coverage to the work surface. Shielding gas may flow through trailing area 62 towards the post-welded surface 60 to thus cool the post-welded surface 60.

Figure 10:
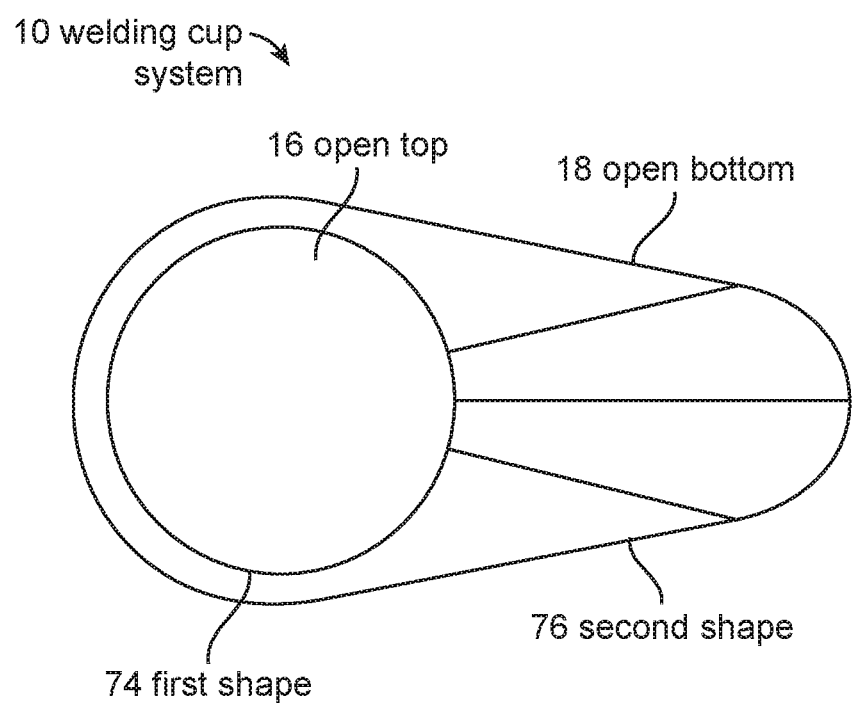
FIG. 10 illustrates a top-down view of a welding cup system, according to some embodiments.

As illustrated in FIG. 10, the open top 16 may define a first shape 74, and the open bottom 18 may define a second shape 76. The first shape 74 may be different than the second shape 76. An area of the first shape 74 may be smaller than an area of the second shape 76. The area of the first shape 74 may be sized and configured such that the open top 16 slideably couples to at least a portion of the torch assembly 12.

In some embodiments, the second shape 76 defines a teardrop shape. The teardrop shape may allow a user of the welding cup system 10 to cool the post-welded surface 60 for an extended duration as the welding cup system 10 continuously moves over a work surface. While cylindrical welding cups currently used may cover equally large portions of the post-welded surface 60 as the welding cup system 10, cylindrical welding cups also cover larger amounts of the work surface and disperse gas throughout the entire work surface that is covered, regardless of whether the surface needs cooling. Thus, the teardrop shape of the bottom side 40 of the welding cup system 10 is advantageous in that the teardrop shape may allow a more direct flow of gas to the post-welded surface 60. Generally, it should be appreciated that the first and second shapes 74, 76 may define any such geometric shapes.

However, in some embodiments, the first shape 74 and the second shape 76 define a same shape. The area of the first shape 74 may be smaller than an area of the second shape 76. The area of the first shape 74 may be sized and configured such that the open top 16 may slideably couple to at least a portion of the torch assembly 12. The area of the second shape 76 may be sized and configured such that the open bottom 18 may cover at least a portion of both the welded surface 70 and the post-welded surface 60.

Figure 11:
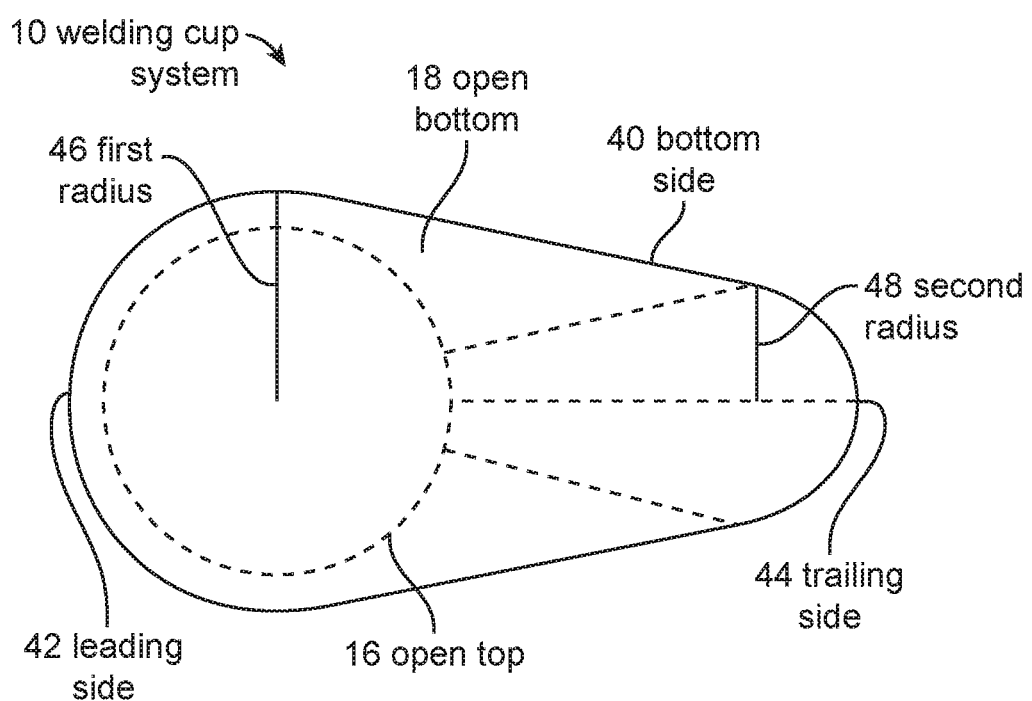
FIG. 11 illustrates a bottom-up view of a welding cup system, according to some embodiments.

With reference to FIG. 11, the welding cup system 10 may include the leading side 42 and the trailing side 44. The leading side may define a first radius 46 and the trailing side may define a second radius 48 that is smaller than the first radius 46. The second radius 48 may be smaller than the first radius 46 such that the open bottom 18 of the welding cup system 10 may gradually decrease in area. Such a decrease in area may allow the post-welded surface 60 to be covered and cooled by the shielding gas as the welding cup system 10 continues over the work surface, without wasting excess shielding gas on surfaces outside of the post-welded surface 60.

Method Embodiments

Figure 12:
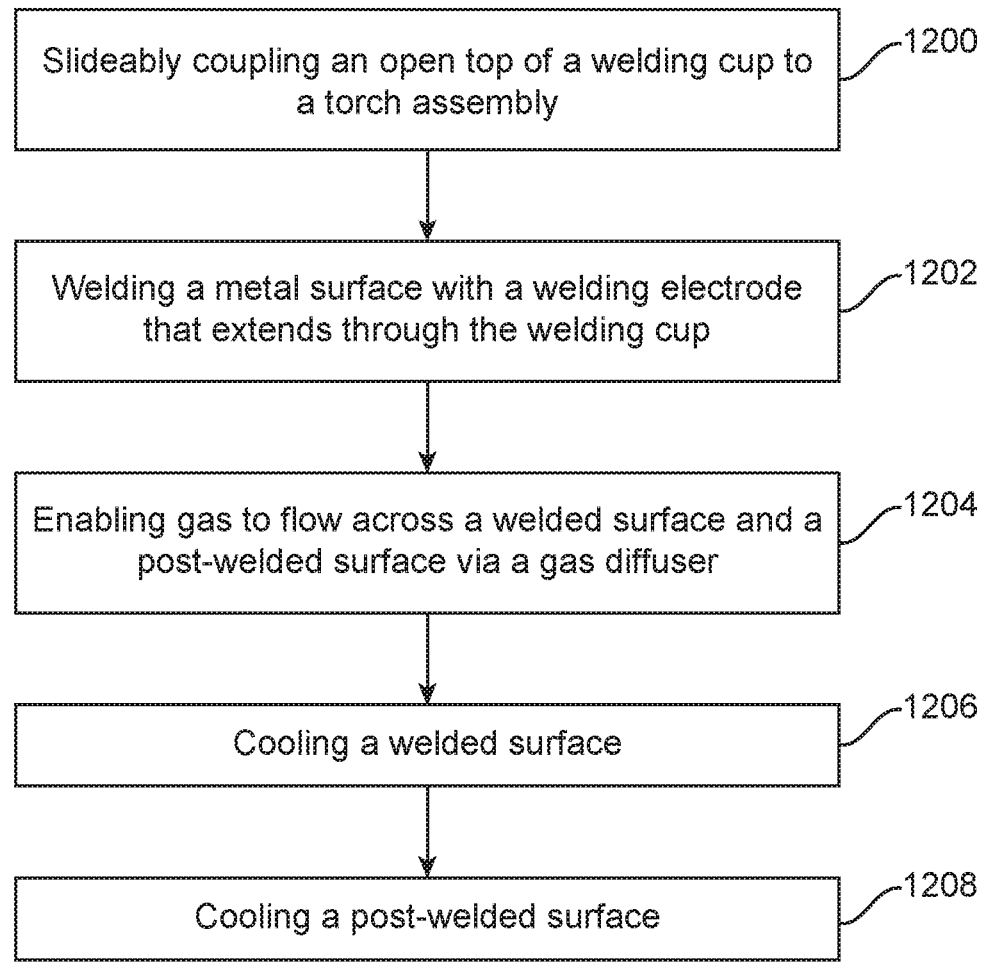
FIG. 12 illustrates a flow chart for using a welding cup system, according to some embodiments.

FIG. 12 illustrates a flowchart of a method for using a welding cup system 10, as described throughout this disclosure. The welding cup system 10 may direct a shielding gas to a metal surface during a welding operation.

In some embodiments, methods of utilizing the welding cup system 10 may include coupling the welding cup system 10 to at least a portion of a torch assembly 12 (at step 1200). Methods may further include welding the metal surface with a welding electrode 26 that may extend through the welding cup system 10 (at step 1202). Methods may further include diffusing, via a gas diffuser 34, the shielding gas across a welded surface 70 and a post-welded surface 60 (at step 1204).

Methods may also include cooling a welded surface 70 (at step 1206) by directing gas from the open top 16 through the open bottom 18 to the welded surface 70. The shielding gas may provide a protective cover to the welded surface 70, thereby allowing the surface 70 to cool without environmental contamination weakening the weld bond.

Even still, methods may include cooling a post-welded surface 60 (at step 1208). The post-welded surface 60 may be located under the open bottom 18 when the welding cup system 10 is in use. Similar to above, the post-welded surface 60 may be cooled by directing gas from the open top through the open bottom to the post-welded surface 60. Additionally, the shielding gas may protect the post-welded surface 72 from environmental contamination that may weaken the weld bond.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A welding cup, comprising:
a tube having an open top, an open bottom, a sidewall extending between the open top and the open bottom, and an open channel extending through an interior portion of the tube from the open top to the open bottom, wherein the open top is arranged and configured to slideably couple to at least a portion of a torch assembly,
wherein the open channel is arranged and configured to allow gas to flow from the open top to the open bottom, and allow a welding electrode to extend through the open channel from the open top towards the open bottom,
wherein a side profile of the tube defines an asymmetrical profile; and
a gas diffuser coupled to the tube and located within the open channel between the open top and the open bottom, wherein as gas flows from the open top to the gas diffuser, the gas diffuser is thereby arranged and configured to evenly spread substantially all of the gas as it reaches the open bottom.

2. The welding cup of claim 1, wherein the open top defines a first area and the open bottom defines a second area that is greater than the first area.

3. The welding cup of claim 1, wherein the gas diffuser comprises an aperture arranged and configured to allow the welding electrode to pass through the gas diffuser.

4. The welding cup of claim 3, wherein the aperture is located off-center on the gas diffuser.

5. The welding cup of claim 4, wherein a bottom side of the open bottom defines a leading side and a trailing side located opposite the leading side, and wherein leading side defines a first radius and the trailing side defines a second radius that is smaller than the first radius.

6. The welding cup of claim 4, wherein a bottom side of the open bottom defines a teardrop shape.

7. The welding cup of claim 5, wherein the sidewall comprises a leading surface and a trailing surface located opposite the leading surface, and wherein the leading surface extends along a first direction and the trailing surface extends along a second direction that is angled with respect to the first direction.

8. The welding cup of claim 5, wherein the open bottom is arranged and configured to allow gas flow to reach a post-welded surface to thereby cool the post-welded surface and reduce oxidation in the post-welded surface.

9. The welding cup of claim 5, wherein an area from the trailing side to the welding electrode is greater than an area from the leading side to the welding electrode.

10. The welding cup of claim 9, wherein when gas flows through the gas diffuser a first amount of gas passes through the area between the trailing side and the welding electrode and a second amount of gas passes through the area between the leading side and the welding electrode.

11. A method of directing argon gas to a metal surface during a welding operation, the method comprising:
welding the metal surface with a welding electrode that extends through a welding cup having an open top, an open bottom, a sidewall extending between the open top and the open bottom, an open channel extending through an interior portion of the welding cup from the open top to the open bottom, and a gas diffuser located within the open channel between the open top and the open bottom, wherein as the argon gas flows from the open top to the gas diffuser, the gas diffuser is thereby arranged and configured to evenly spread substantially all of the argon gas as it reaches the open bottom, and wherein the open top defines a first area and the open bottom defines a second area that is greater than the first area;
cooling a welded surface by directing gas from the open top through the open bottom to the welded surface that is located under the open bottom; and
cooling a post-welded surface by directing gas from the open top through the open bottom to the post-welded surface that is located under the open bottom.

12. The method of claim 11, wherein the welded surface defines a welded area and the post-welded surface defines a post-welded area that is greater than the welded surface.

13. The method of claim 11, further comprising slideably coupling the open top to at least a portion of a torch assembly.

14. The method of claim 11, diffusing, via the gas diffuser, the gas across the welded surface and the post-welded surface.

15. The method of claim 14, wherein the gas comprises argon gas.

16. A welding cup, comprising:
a tube having an open top, an open bottom, a sidewall extending between the open top and the open bottom, and an open channel extending through an interior portion of the tube from the open top to the open bottom, wherein the open top is arranged and configured to slideably couple to at least a portion of a torch assembly,
wherein the open channel is arranged and configured to allow gas to flow from the open top to the open bottom, and allow a welding electrode to extend through the open channel from the open top towards the open bottom,
wherein the open top defines a first shape and the open bottom defines a second shape; and
a gas diffuser coupled to the tube and located within the open channel between the open top and the open bottom, wherein as gas flows from the open top to the gas diffuser, the gas diffuser is thereby arranged and configured to evenly spread substantially all of the gas as it reaches the open bottom.

17. The welding cup of claim 16, wherein the first shape is different than the second shape, and wherein an area of the first shape is smaller than an area of the second shape.

18. The welding cup of claim 16, wherein the first shape and the second shape define a same shape, and wherein an area of the first shape is smaller than an area of the second shape.

19. The welding cup of claim 16,
wherein a bottom side of the open bottom defines a teardrop shape having a leading side and a trailing side located opposite the leading side whereby an area from the trailing side to the welding electrode is greater than an area from the leading side to the welding electrode,
wherein when gas flows through the gas diffuser a first amount of gas passes through the area between the trailing side and the welding electrode and a second amount of gas passes through the area between the leading side and the welding electrode, and wherein the first amount of gas is greater than the second amount of gas.

20. The welding cup of claim 16, wherein the gas diffuser comprises an aperture arranged and configured to allow the welding electrode to pass through the gas diffuser.

\* \* \* \* \*